Dec. 3, 1946.       J. P. C. PETER            2,412,170
           METHOD OF MAKING GYPSUM CEMENT
                Filed July 1, 1941
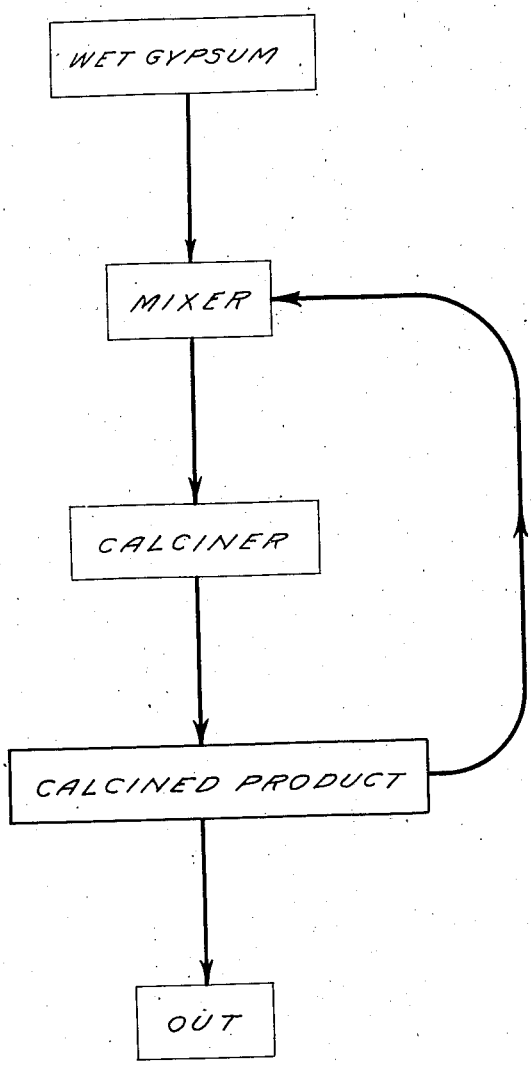
                                       INVENTOR.
                           JOHN P. C. PETER,
                       BY Ellis S. Middleton
                                       ATTORNEY.

Patented Dec. 3, 1946

2,412,170

UNITED STATES PATENT OFFICE 2,412,170

METHOD OF MAKING GYPSUM CEMENT

John P. C. Peter, Westfield, N. J., assignor to American Cyanamid Company, New York, N. Y., a corporation of Maine Application July 1, 1941, Serial No. 400,629

2 Claims. (Cl. 23—122)

The present invention relates to a method of drying wet gypsum and is particularly applicable as a step preparatory to calcination thereof and includes mixing hot calcined gypsum therewith in a quantity sufficient to reduce the free moisture content of the mixture to a desired point. The mix is then subjected to calcination in the usual manner.

It frequently happens that gypsum, at the time that calcination is to take place, is wet, either by design or accident. This is particularly true of a by-product gypsum such as that produced by the reaction between phosphate rock and sulfuric acid. While the invention is particularly adapted for the treatment of by-product gypsum, yet it is to be understood that it is not to be limited thereto.

By-product gypsum, after being filtered from the acid menstruum, is usually washed, thickened and classified and finally centrifuged as dry as possible. Even at this point, however, it may contain from 10 to 20% moisture although usually this figure is approximately 12%.

Experience has shown that if this moist gypsum is then loaded into the calcining kettles to drive off, first, free moisture and then three-quarters of the combined water to produce calcined gypsum or calcium sulfate hemihydrate, the moist gypsum cakes on the bottom and sides of the kettle, tending not only to burn out or deteriorate the kettles very rapidly, but, unless handled very carefully, will actually stop the stirring apparatus.

In order to avoid this, such moist gypsum must be added very gradually. As a result, the rate of calcination is retarded. This is illustrated by the fact that with kettles of the same size, dry gypsum may be filled into an empty kettle in approximately 45 minutes, whereas wet gypsum containing, say 12% moisture, requires between one and one-quarter and one and one-half hours to fill one-half a kettle.

Calcination of a moist gypsum also tends to produce a product which is inferior in working qualities and physical properties to gypsum calcined in the substantial absence of free moisture for the reason that in the former instance, there is a tendency to over-burn the gypsum, that is, to produce substantial quantities of calcium sulfate anhydrite. This overburned gypsum is undesirable in that plaster or stucco made therefrom does not carry a sufficient quantity of water, it takes longer to set and the initial strength of the product is reduced.

It has been discovered that if a wet gypsum is mixed with hot calcined gypsum in a ratio sufficient to reduce the free moisture content of the mixture to a desired point, that this substantially dry mixture may then be loaded into the calcining kettles at a rate comparable to that used with normally dry gypsum and calcination completed without the heretofore existing difficulties. The accompanying drawing is a flow sheet of the process.

For instance, it has been discovered that if 670 pounds of calcined gypsum, at a kettle discharge temperature of from 300 to 400° F., is mixed with 1330 pounds of moist gypsum containing substantially 12% of free moisture until the two are thoroughly commingled, the resulting product contains not more than 1% free moisture.

Forty tons of good quality calcined gypsum may be prepared from such a mixture in approximately ten hours. On the other hand, if moist gypsum containing approximately 12% of free water were loaded into the kettles without drying, it would require at least eighteen hours to produce the same quantity of finished product.

Obviously the amount of calcined gypsum to be mixed with the wet gypsum will depend upon the temperature of the calcined product and the amount of free moisture in the wet material. Generally speaking, however, one part of hot calcined gypsum by weight will be sufficient to reduce the free moisture content of two parts of wet gypsum containing approximately 12% moisture. This moisture figure is that normally occurring when wet gypsum has been centrifuged, for unless a special and expensive type of water removing equipment is used, it will be difficult to reduce this figure below that point.

The mixing operation does not require expensive or intricate apparatus for it has been found that an ordinary concrete or plaster mixer or in fact, any device capable of thorough mixing of the ingredients to permit escape of excess moisture, is eminently satisfactory. Of course, most of the free moisture is removed as such and taken up as water of crystallization by the calcined gypsum, although some will actually escape as free moisture.

It is to be understood that the invention is not limited to the exact proportions of hot calcined gysum to be added to the wet or moist material as a reasonable leeway in ratio is to be interpreted as coming within the purview of the invention.

While the invention has been shown and described with particular reference to specific embodiments, it is to be understood that it is not to be limited thereto, but is to be construed broadly

I claim:

1. A method of producing calcium sulfate hemihydrate from wet gypsum which comprises mixing sufficient hot, freshly calcined calcium sulfate hemihydrate with wet gypsum to remove substantially all the free moisture therein, calcining the resulting substantially dry gypsum at temperatures of 300–400° F. to produce hot calcium sulfate hemihydrate, and returning a portion of said hot calcium sulfate hemihydrate to the mixing step.

2. A method of producing calcium sulfate hemihydrate from wet gypsum containing about 12% of free moisture which comprises mixing about two parts by weight of said wet gypsum with one part of hot, freshly calcined calcium sulfate hemihydrate to remove substantially all the free moisture in the gypsum, calcining the resulting substantially dry gypsum at temperatures of 300–400° F. to produce hot calcium sulfate hemihydrate, and returning a portion of said hot calcium sulfate hemihydrate to the mixing step.

JOHN P. C. PETER.